June 16, 1931. A. L. FORTSON 1,810,415
STALK CUTTER ATTACHMENT
Filed April 4, 1930 2 Sheets-Sheet 1
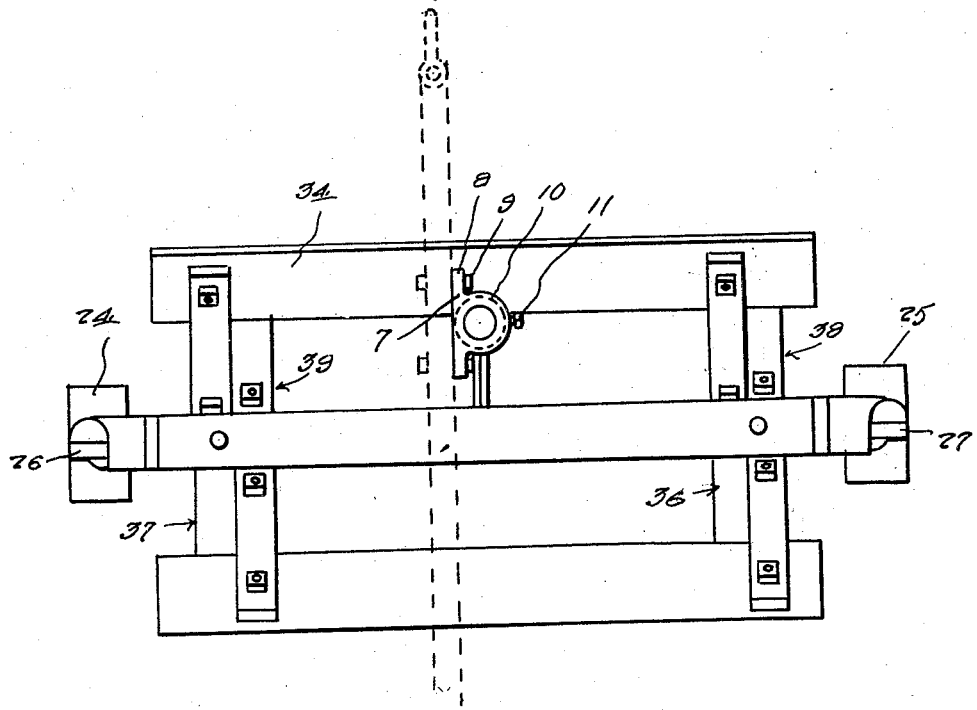
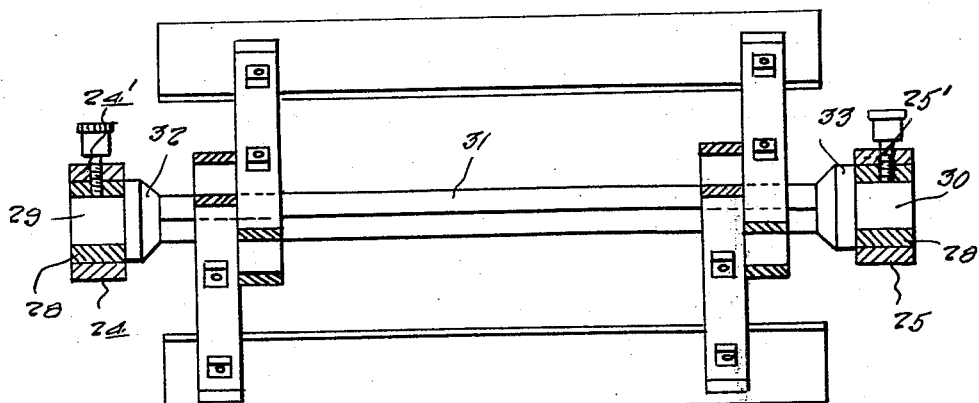
Inventor
A. L. Fortson
By Clarence A. O'Brien
Attorney

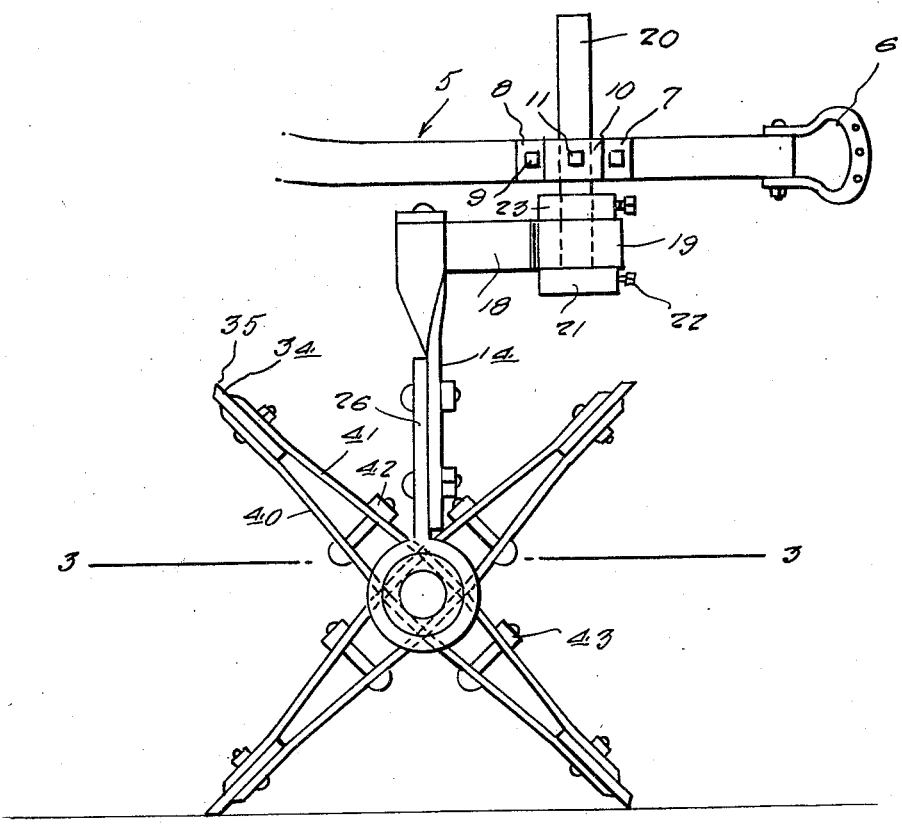
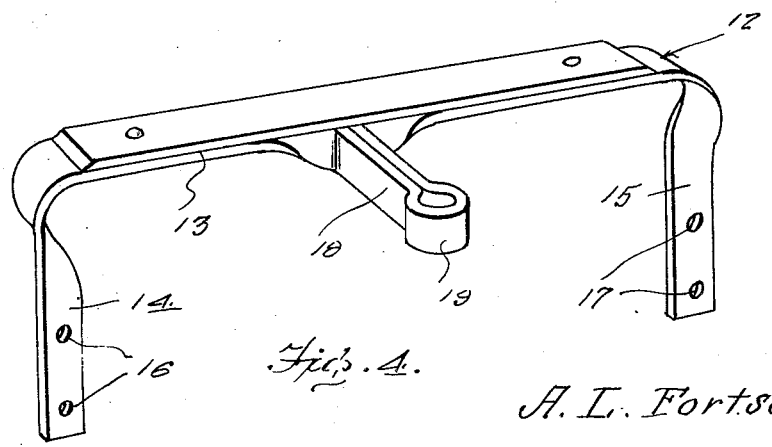

Patented June 16, 1931

1,810,415

UNITED STATES PATENT OFFICE

ASA L. FORTSON, OF MELVIN, TEXAS, ASSIGNOR OF ONE-FOURTH TO S. W. HUGHES, OF BRADY, TEXAS

STALK CUTTER ATTACHMENT

Application filed April 4, 1930. Serial No. 441,576.

This invention relates to stalk cutters, and is particularly adapted for use on lister plows, sulky plows or planters.

An object of the invention is to provide a stalk cutter attachment for connection to the beam of the agricultural implement forwardly of the earth working elements to cut the stalks at the same time, that the land is being tilled, and to furthermore provide a stalk cutter that will swing with the implement when the said implement is turned.

Further objects of the invention are to provide, in a manner as hereinafter set forth, a stalk cutting attachment of the character referred to that is strong, compact and durable, thoroughly reliable for its intended purpose, very simple in its method of assembly, adapted for attachment to all standard structural implements, that is very simple in its method of assembly, and comparatively inexpensive to manufacture and operate.

With the foregoing and other objects in view, the invention consists of a novel construction, combination and arrangement of parts, as will be hereinafter more specifically described and illustrated in the accompanying drawings, wherein is disclosed an embodiment of the invention, but it is to be understood that changes, variations, and modifications, may be resorted to without departing from the spirit of the claims hereto appended.

In the drawings wherein like reference characters denote corresponding parts throughout the several views:—

Figure 1 is a top plan view of the stalk cutter in accordance with the present invention.

Fig. 2 is a side elevation thereof.

Fig. 3 is a horizontal section taken substantially on the line 3—3 of Fig. 2.

Fig. 4 is a perspective view of the frame.

Referring to the drawings in detail, wherein for the purpose of illustration, is shown the preferred embodiment of the invention, 5 indicates generally the beam of an agricultural implement such as a lister plow, planter or the like which projects forwardly of the earth working implement attached to the rear of this beam.

On the forward end of the beam 5 is a clevis to which horses or other pulling means may be attached.

To one side of the beam 5 is secured a bracket 7 that has lateral ears 8 secured to this beam, by means of bolts 9. The central portion of the bracket 7 is formed with a sleeve 10 and in this sleeve is a set screw 11 for anchoring an upright shaft within the sleeve 10, which shaft will be presently described.

The frame for the stalk cutter is indicated generally at 12, and is of inverted U-shape in configuration. This frame has a relatively elongated crown or bight portion 13 depending from which are the side arms 14, 15 and each of the arms is formed with pairs of openings 16, 17.

Projecting forwardly from the center of the bight portion is a straight arm 18 terminating in a sleeve 19. An upright shaft 20 has the lower portion thereof extending through the sleeve 19 and below the sleeve 19 there is mounted on the shaft, a collar 21 which is adjustable with respect to the shaft by means of a set screw 22. The axis of the sleeve is disposed vertically, and the shaft 20 projects therefrom in a vertical plane. The upper portion of the shaft 20 extends through the sleeve 10 on the bracket 7 and interposed between the bracket and the sleeve 19 there is an adjustable collar 23 circumposed about the shaft.

Thus, it will be seen that the frame is adjustable with respect to the shaft 20. The sleeve 19 of the frame 12 is freely turnable about the shaft 20. Rising from a pair of bearing sleeves 24, 25 are arms 26, 27 which are bolted to the depending arms 14, 15 of the frame 12.

Supported in the sleeves 24, 25 are metallic bushings 28 in which the reduced ends 29, 30 of the axle 31 are journaled. Grease or oil cups 24'—25' are supported on the sleeves 24, 25 for lubricating the axle ends that rotate in the bushings 28.

31 is a shaft of angular cross-section disposed transversely of the agricultural implement which carries the stalk cutter in accordance with the present invention.

Adjacent the reduced ends of the shaft 31, there are enlarged shoulders 32, 33 to prevent endwise play of the shaft in its bearings.

Four flat cutting blades 34 extend transversely of the frame to rotate with the shaft 31 between the arms of the frame. These blades are disposed edgewise and their longitudinal edges, are sharpened as at 35 to cut the stalks. The blades are spaced at quadrants from each other, so that when the apparatus is drawn over the ground, the blades will successively engage the stalks in step by step relation to cut the same.

The end portions of the radially disposed blades 34 are bolted between the ends of two pairs of flat bars indicated generally at 36, 37, while the end portions of the alternate, radially disposed blades, are likewise bolted between the ends of two pairs of flat bars, indicated at 38, 39, thereby forming spokes for the blades.

The bars 40, 41 of each pair are bowed outwardly intermediate their ends, in opposite directions, and at their centers, bear against the opposed faces of the angular axle 12, as will be clearly understood by referring to Fig. 2 of the drawings.

One each side of the axle, the pairs of bars, are bolted together as at 42, 43 to prevent the pairs of bars from springing over the corners of the axle, and also to prevent lateral shifting thereof.

It is thought that the present embodiment of the invention has been disclosed in considerable detail since in actual practice it attains the features of advantage enumerated as desirable in the statement of the invention and the above description.

It is to be understood that by describing in detail herein any particular form, structure, or arrangement, it is not intended to limit the invention beyond the terms of the several claims, or the requirements of the prior art.

Having thus described my invention, what I claim as new is:—

1. In a stalk cutter and in combination, spaced bearings, a shaft of angular cross section journaled in and arranged between said bearings, radially disposed blades spaced apart and grouped about said shaft, and pairs of connections between the shaft and blades, located between the bearings; the connections of each pair being disposed at right angles to each other, and each connection including two bars disposed against opposite flat sides of the shaft and receiving between their end portions blades, means extending through and connecting said end portions of the bars and the blades, and means connecting the bars together at points intermediate the shaft and the blades and holding the bars against said opposite flat sides of the shaft.

2. In a stalk cutter and in combination, spaced bearings, a shaft journaled in and arranged between said bearings, radially disposed blades spaced apart and group about said shaft, and pairs of connections between the shaft and blades, located between the bearings; the connections of each pair being disposed at right angles to each other, and each connection including two bars receiving between their end portions blades, and means extending through and connecting said end portions of the bars and the blades.

In testimony whereof I affix my signature.

ASA L. FORTSON.